July 5, 1966 P. B. ZEIGLER ETAL 3,258,987
ADJUSTABLE STEERING COLUMN
Filed Sept. 21, 1964 2 Sheets-Sheet 1

INVENTORS
Philip B. Zeigler &
BY Robert D. Wight

W. F. Wagner
ATTORNEY

July 5, 1966  P. B. ZEIGLER ETAL  3,258,987
ADJUSTABLE STEERING COLUMN
Filed Sept. 21, 1964  2 Sheets-Sheet 2
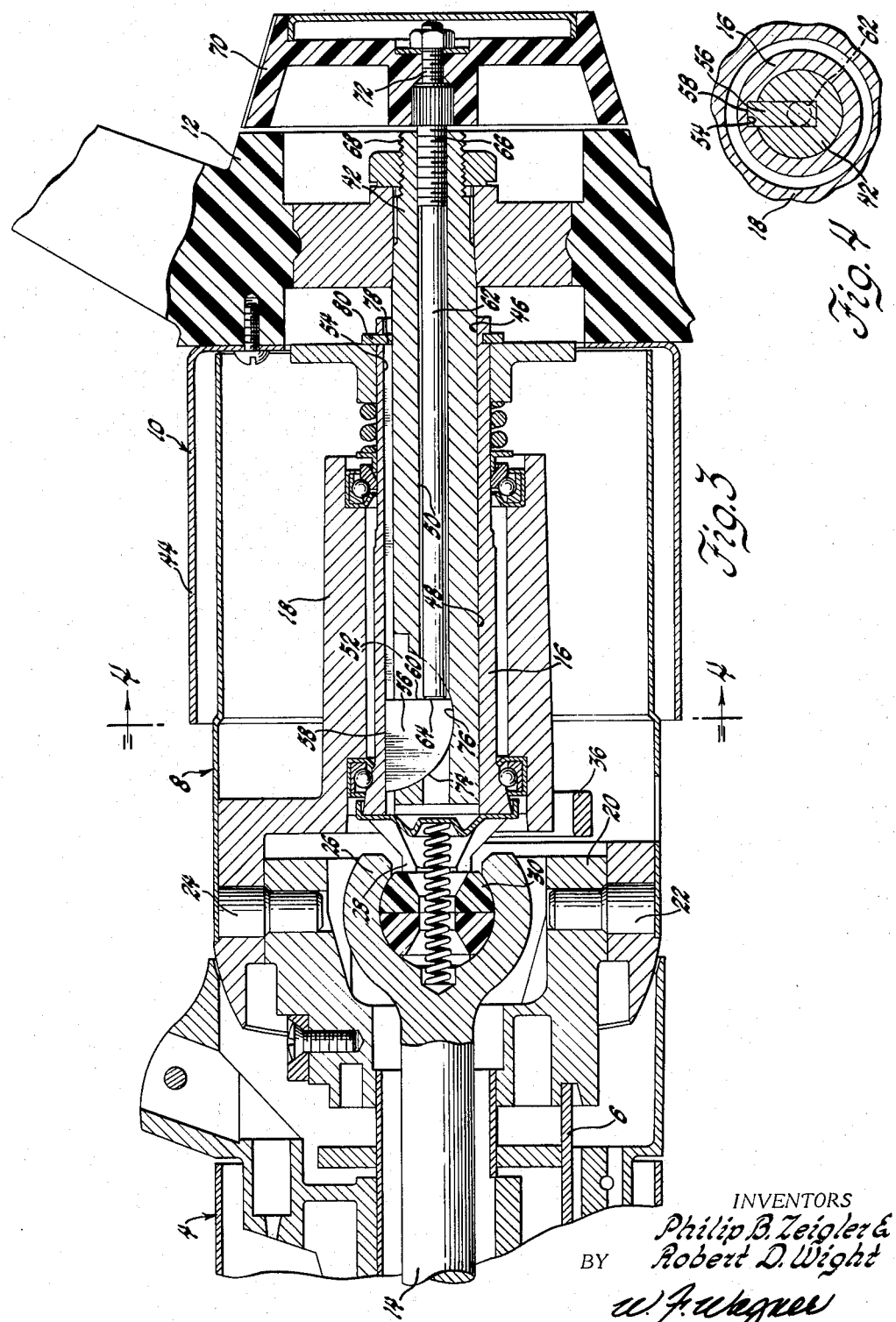
INVENTORS
Philip B. Zeigler &
Robert D. Wight
BY
W. F. Wagner
ATTORNEY

United States Patent Office 3,258,987
Patented July 5, 1966

3,258,987
ADJUSTABLE STEERING COLUMN
Philip B. Zeigler and Robert D. Wight, Saginaw, Mich., assignors to General Motors Corporation, Detroit, Mich., a corporation of Delaware
Filed Sept. 21, 1964, Ser. No. 397,863
8 Claims. (Cl. 74—493)

This invention relates to steering mechanisms and more particularly to a steering assembly enabling selective adjustment of both the angular plane of rotation and longitudinal position of the steering wheel.

Certain production automobiles currently being manufactured are provided with a steering column assembly in which the upper portion thereof is arranged for tilting adjustment about a transverse axis to enable selective angular positioning of the plane of rotation of the wheel through a range of preselected positions. While this arrangement has been found to be exceptionally advantageous in accommodating vehicle operators of varying stature, in many instances the physical stature or personal preference of the operator varies to such an extent that additional selective adjustment of the longitudinal position of the wheel is desirable.

The present invention is concerned primarily with providing a compound steering wheel adjustment which enables selective adjustment of the steering wheel position both angularly and longitudinally so that a wide range of composite or separate wheel adjustments are available to the operator.

An object of the present invention is to provide an improved steering mechanism for vehicles.

Another object is to provide a vehicle steering column assembly which enables selective adjustment of the angular inclination of a vehicle steering wheel together with selective adjustment of the longitudinal position of the wheel irrespective of the angular inclination.

Still another object is to provide an arrangement of the stated character including reliable and positive locking means for retaining the adjusted positions of the mechanism.

Yet a further object is to provide a telescoping connection for adjustable steering assemblies enabling infinitely fine increments of adjustment.

A still further object is to provide locking means for a telescoping mechanism exhibiting ease, simplicity and effectiveness in establishing, releasing and re-establishing locking engagement thereof.

These and other objects, advantages and features of the invention will become more readily apparent as reference is had to the accompanying specification and drawings wherein:

FIGURE 3 is a greatly enlarged sectional plan view of the telescoping portion of the structure taken on line 3—3 of FIGURE 2; and FIGURE 4 is a sectional end elevation looking in the direction of arrows 4—4 of FIGURE 3.

Figure 1:
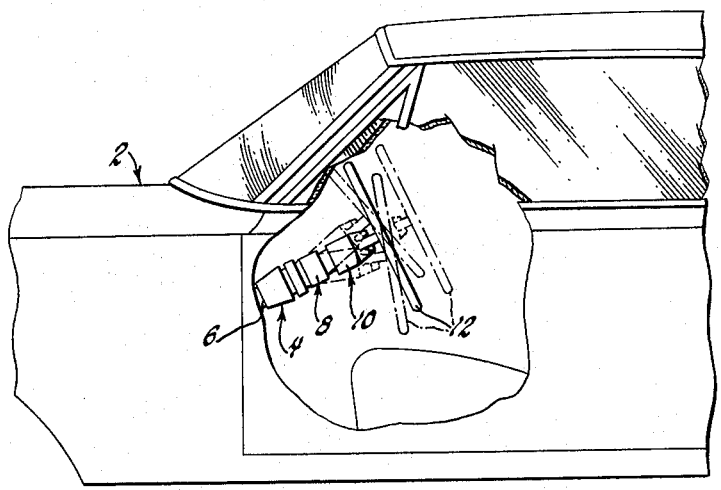
FIGURE 1 is a fragmentary side elevational view of a portion of a passenger vehicle with parts broken away to illustrate the general location and range of adjustable movement of a steering column assembly made in accordance with the invention.

Referring now to the drawings and pasticularly FIGURE 1, there is shown a portion of a conventional passenger car identified by the reference numeral 2. Disposed interiorly of the vehicle in the usual position is a steering column assembly 4 comprising an angularly inclined fixed lower section 6 and a tiltable upper section 8 which includes an upper telescoping section 10 and the usual steering wheel 12. As shown in dotted lines, the upper section 8, telescoping section 10 and steering wheel 12 are adapted for tilting movement as a unit about a horizontal transverse axis both upwardly and downwardly from the normal position shown in solid lines wherein the plane of the steering wheel is normal to the axis of column 6. In addition, according to the invention, the telescoping section 10 and wheel 12 are axially movable relative to upper section 8 either concurrently with tilting adjustment or independently thereof to establish varying longitudinal positions for the wheel 12 relative to the vehicle operator, not shown.

Figure 2:
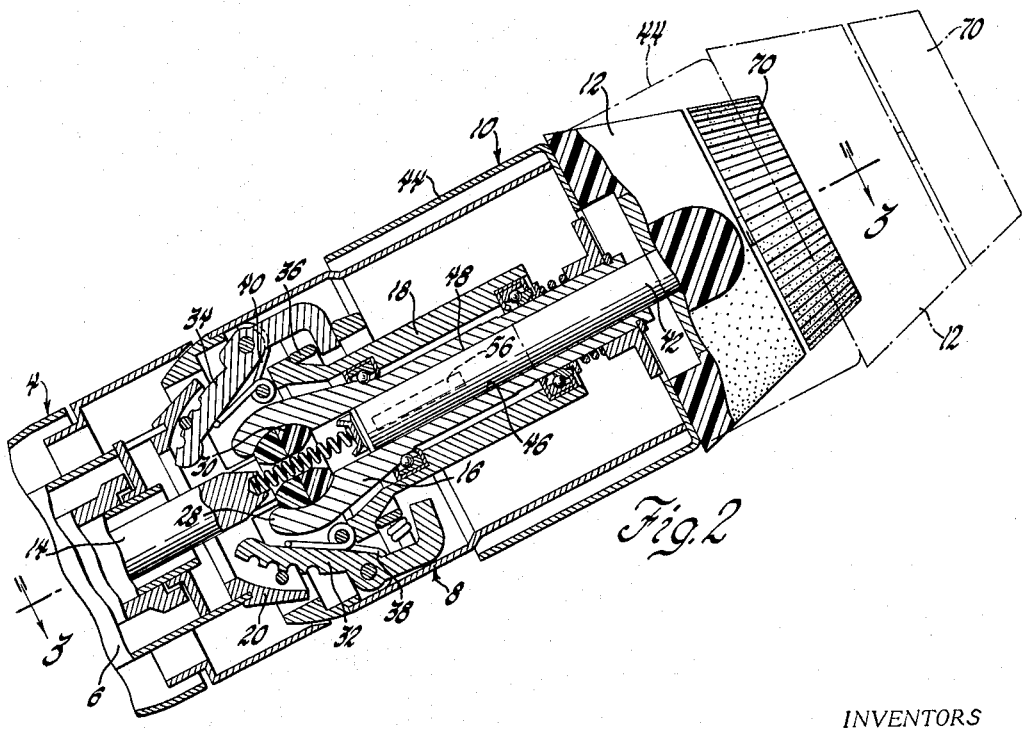
FIGURE 2 is an enlarged side elevational view, partly in section, and with parts broken away, illustrating details of construction of a steering assembly in accordance with the invention.

As seen best in FIGURE 2, steering column assembly 4 includes a lower steering shaft 14 rotatably journalled in the lower column portion 6. Axially aligned with lower shaft 14 is an upper steering shaft 16 which in turn is rotatably supported in a housing 18. As seen best in FIGURE 3, housing 18 is pivotally connected with a lower support housing 20 on the upper end of section 6 by means of transversely spaced apart trunnions 22 and 24. Shafts 14 and 16 are operatively connected together by cross-yoke portions 26 and 28 at their adjacent ends which interlockingly engage in a cross-slotted ball 30, the geometric center of which coincides with the axis of trunnions 22 and 24. It will thus be seen that the upper section 8 and housing 18 mounted therein may be inclined upwardly and downwardly relative to section 6, while retaining a positive operating connection between upper shaft 16 and lower shaft 14. Locking of the angular position of section 8 relative to section 6 is accomplished by spring biased dual latch mechanisms 32 and 34 which are manually disengageable by a lever, not shown, acting on a lifter ring 36. It will be understood that upon release of the lever, spring elements 38 and 40 automatically bias the levers to restore a locked position. Inasmuch as details of construction of the tilting mechanism and latch means therefor form no part of the present invention, further description thereof is omitted. However, for a more complete description, reference may be had to copending application Serial No. 221,833, filed September 6, 1962, in the names of Philip B. Zeigler and Robert D. Wight, entitled "Adjustable Steering Column," now Patent No. 3,167,971 and assigned to General Motors Corporation.

In accordance with the principal feature of the invention, the telescoping section 10 which includes the steering wheel 12 is formed with a depending stub shaft 42 adapted for selective axial positioning relative to upper steering shaft 16 and a sleeve 44 which concentrically surrounds upper section 8.

As seen best in FIGURE 3, upper steering shaft 16 is formed with a central longitudinal bore 46 in which the outer diameter 48 of stub shaft 42 slidably interfits. In order to secure the steering wheel 12 in any selected telescoped position relative to steering shaft 16, stub shaft 42 is formed with a longitudinal drilled passage 50 which extends the entire length thereof, while near the lower end thereof there is formed a semi-circular Woodruff keyway 52, the base of which intersects passage 50. The inner diameter of bore 46 in upper steering shaft 16 is formed with a single flat bottom longitudinal groove 54 which is radially aligned with keyway 52 and corresponds in width thereto. Disposed within keyway 52 is an approximately quarter circular Woodruff key 56 having a radially outer flat surface 58 which tracks in groove 54 and a transverse flat surface 60 which is normally perpendicular to the axis of passage 50. Extending downwardly through passage 50 is an actuating rod 62, the lower end 64 of which normally abuts flat surface 58 of Woodruff key 56. The upper end of rod 62 in turn abuts an enlarged externally threaded portion 66 which cooperates with internal threads, not shown, in the upper end 68 of stub shaft 42. Alternatively, rod 62 and threaded portion 66 may be formed integrally. A fluted knob 70 is attached to the terminal end 72 of portion 66 so that the latter may threadably displace rod 62 downwardly against the surface 58 of Woodruff key 56 or be withdrawn therefrom as required. Consequently, when the fluted knob 70 is turned in one direction, key 56 is urged downwardly so that the quarter circular surface 74 thereof follows the curved ramp 76 formed by the lower half of the keyway and urges the Woodruff key in a radial outward direction firmly seating surface 58 thereof against the flat bottom of groove 54 thereby firmly locking stub shaft 42 axially relative to upper steering shaft 16. Reversing the direction of rotation of the fluted knob naturally releases pressure on the Woodruff key and enables the stub shaft to be moved freely axially of upper steering shaft 16.

It is to be noted that the Woodruff key 56 not only functions to establish locked axial positions of the stub shaft, but also serves to key the stub shaft and steering shaft together with respect to turning engagement thereby eliminating the more elaborate splining commonplace with axially telescoping members. In addition, the radial outer extremity of the Woodruff key which tracks in groove 54 also cooperates with a radially inwardly directed tongue portion 78 formed on a circular clip 80 surrounding upper shaft 16 near the upper end thereof to establish a maximum outer telescoping limit of movement of stub shaft 42.

From the foregoing, it will be seen that a novel and improved steering assembly has been provided. A construction according to the invention not only permits custom adjustment of the steering wheel to the particular desires of individual operators, but in addition renders such adjustments quick, easy, convenient and positive.

While but one embodiment of the invention has been shown and described, other changes and modifications may be made therein. It is, therefore, to be understood that it is not intended to limit the invention to the embodiment shown, but only by the scope of the claims which follow.

We claim:

1. In combination with a steering assembly having an upper section tiltably adjustable about a transverse axis relative to a lower steering section, an upper steering shaft rotatable in said upper section, said upper shaft having an axial passage formed therein including a radially displaced axially extending groove, a steering wheel having a stub shaft attached thereto reciprocably disposed in said passage, a transversely movable key mounted in the lower end of said stub shaft engaging said groove, an axial bore formed in said stub shaft, a rod disposed in said bore threadably displaceable relative to said stub shaft and into abuttingly engaging said key, and a manually rotatable means on said steering wheel operative to threadably actuate said rod whereby said key is transversely displaced into frictional locking engagement with said groove.

2. In a device of the class described, a first shaft having an axial passage including a radially displaced groove, a second shaft slidably disposed in said axial passage, means forming an axial bore in said second shaft, a rod extending through said bore threadably engaging said shaft, a radially extending slot formed in said second shaft near the lower end thereof intersecting said bore, a key in said slot having a first portion engageable with said groove and a second portion abuttingly engaging said rod, said slot having an inclined ramp portion engageable with said key effective to cause radially outward displacement thereof upon axial displacement of said rod.

3. In a device of the class described, a first shaft having an axial passage including a radially displaced groove, a second shaft slidably disposed in said passage, means forming an axial bore extending through said second shaft, a rod disposed in said bore and threadably engaged at one end thereof with said shaft, a keyway near the other end of said shaft extending radially outwardly from said bore, a key in said keyway having a first straight portion engageable with said groove and a second straight portion abuttingly engaging said rod, said keyway including a curved ramp portion effective to cause radially outward displacement of said key upon axial displacement of said rod.

4. In a device of the class described, a first shaft having an axial passage including a radially displaced flat bottom groove, a second shaft slidably disposed in said passage, means forming an axial bore extending through said second shaft, a rod disposed in said bore and threadably engaged at one end thereof with said shaft, a keyway near the other end of said shaft extending radially outwardly from said bore, a key in said keyway having a first straight flat bottom portion engageable with said groove and a second straight flat bottom portion abuttingly engaging said rod, said keyway including a curved ramp portion effective to cause radially outward displacement of said key upon axial displacement of said rod.

5. In a device of the class described, a first shaft having an axial passage including a single radially displaced groove, a second shaft telescopingly disposed in said passage, means forming an axial bore extending through said second shaft, a rod disposed through said bore and threadably engaged at one end thereof with said shaft, a radially directed keyway formed in said shaft having a semi-circular base intersecting said bore near the lower end thereof, a key in said keyway having a first edge portion engageable with said groove, a second edge portion abuttingly engaging said rod, and a semi-circular edge portion in bearing engagement with said semi-circular base.

6. The structure set forth in claim 5 wherein said keyway is approximately a half circle and said key is approximately a quarter circle.

7. The structure set forth in claim 6 wherein said rod engages said second edge portion closely adjacent to the radial inner extremity thereof.

8. The structure set forth in claim 7 including stop means near the outer end of said first shaft engageable by said key to limit outward movement of said second shaft.

References Cited by the Examiner
UNITED STATES PATENTS

| | | |
|---|---|---|
| 1,175,744 | 3/1916 | Giles. |
| 2,559,093 | 7/1951 | Rzeppa _____ 74—492 X |
| 2,760,382 | 8/1956 | Bliss _____ 74—492 |
| 2,816,455 | 12/1957 | Hammond _____ 74—492 |
| 2,973,979 | 2/1961 | Musset _____ 287—52.05 |
| 3,113,798 | 12/1963 | Kramer. |
| 3,167,971 | 2/1965 | Ziegler _____ 74—493 |
| 3,188,880 | 6/1965 | Caine _____ 74—493 |

BROUGHTON G. DURHAM, *Primary Examiner.*

C. F. GREEN, *Assistant Examiner.*